(12) United States Patent
Earthrowl (10) Patent No.: US 6,394,659 B1
(45) Date of Patent: May 28, 2002

(54) CAGES FOR SPLIT ROLLER BEARINGS

(75) Inventor: Brian Edward Earthrowl, Kinga Lynn (GB)

(73) Assignee: Cooper Rolling Bearings Company Limited (GB)

( * ) Notice: Subject to any disclaimer, the term of this patent is extended or adjusted under 35 U.S.C. 154(b) by 0 days.

(21) Appl. No.: 09/600,377

(22) PCT Filed: Jan. 15, 1999

(86) PCT No.: PCT/GB99/00138
§ 371 (c)(1),
(2), (4) Date: Jul. 14, 2000

(87) PCT Pub. No.: WO99/36706
PCT Pub. Date: Jul. 22, 1999

(30) Foreign Application Priority Data

| Jan. 16, 1998 | (GB) | 9800978 |
| Sep. 11, 1998 | (GB) | 9819907 |

(51) Int. Cl.[7] ............ F16C 33/46; B21K 1/05
(52) U.S. Cl. .......... 384/572; 29/898.067; 384/577
(58) Field of Search ............... 384/572, 573, 384/575, 577, 578; 29/898.067, 898.065

(56) References Cited

U.S. PATENT DOCUMENTS

| 1,340,310 A | * | 5/1920 | Wolff | 29/898.067 X |
| 2,575,072 A | * | 11/1951 | Rozner | 384/578 |
| 4,239,304 A | | 12/1980 | Wakunami | 384/573 |
| 4,397,507 A | * | 8/1983 | Kraus et al. | 384/572 |
| 4,419,800 A | * | 12/1983 | Bihler et al. | 29/898.067 |
| 4,472,007 A | * | 9/1984 | De Vito | 384/572 |
| 4,865,473 A | * | 9/1989 | De Vito | 384/577 X |
| 5,033,876 A | * | 7/1991 | Kraus | 384/577 X |
| 5,178,474 A | * | 1/1993 | Muntnich et al. | 384/577 |

FOREIGN PATENT DOCUMENTS

| BE | 851.942 | | 9/1977 | | |
| CH | 365582 | | 12/1962 | | |
| DE | 3709673 | | 10/1988 | | |
| DE | 4142801 A | * | 6/1993 | | 384/577 |
| DE | 4220585 | * | 1/1994 | | 384/576 |
| EP | 392146 | | 10/1990 | | |

* cited by examiner

Primary Examiner—Thomas R. Hannon
(74) Attorney, Agent, or Firm—Samuels, Gauthier & Stevens (57) ABSTRACT

A cage (14) for a split roller bearing (10) is composed of two semi-circular components (15) detachably interconnected at their ends. Each of the components (15) is itself constructed from a pair of blanks (17). Each blank (17) takes the form of a mild steel pressing with a continuous semi-circular wall portion (18) with spaced-apart projections (19, 20) at the sides. The projections (19, 20) are bent along fold lines (L, M) so that the wall portions (18) form the sides (24) of the cage and some of the projections (20) overlap at a centre region (30) of the cage and are fixed together. The rollers (11) are located in pockets (40) between side edges of the projections (19, 20).

17 Claims, 9 Drawing Sheets

CAGES FOR SPLIT ROLLER BEARINGS

TECHNICAL FIELD

The present invention relates to split roller bearings and more particularly to cages and cage components therefor.

BACKGROUND OF THE INVENTION

As is known, a split roller bearing of conventional design employs inner and outer rings between which a series of rollers are held in spaced apart relationship by a cage to locate in raceways formed by the rings. The bearing is made to separate into two halves about a diametric plane and each half of the bearing is then composed of semi-circular inner and outer ring components and a semi-circular cage component. It is necessary for the individual cage components to retain the associated rollers when the bearing is separated. Conventional cage components are made from die-cast aluminium or from machined aluminium or gun metal. To fasten the cage components together to form a continuous ring it is conventional to employ separate fastening clips or spring plates.

A general object of the invention is to provide an improved form of cage component for use in split roller bearings.

DISCLOSURE OF THE INVENTION

BACKGROUND ART

CH-A-365582 which has an English language equivalent GB-A-919983 describes a circular cage for a roller bearing which is formed from a blank which is bent to form a continuous wall and bars excluding therefrom and spaced apart to define pockets for receiving the rollers.

In one aspect, and as is known from GB-A-919983, the invention provides a cage component for use in a roller bearing; said component being made from a pair of separate parts or blanks bent to shape and joined together, the blanks having continuous wall portions for overlapping the ends of rollers as the sides of the component and projections spaced apart along the continuous wall portions and aligned to form pockets for receiving and locating the rollers with at least some of the corresponding aligned projections of the blanks being joined to one another at a central region between the continuous wall portions. In contrast to GB-A-919983, and in accordance with the invention, the blanks are semi-circular and the component is equipped with integral inter-engageable complementary releasable fixing means at its opposite ends for enabling the component to be detachably interconnected with another similar component to form a complete circular cage and the regions where the aligned projections of the blanks are joined together are defined by face-to-face overlapping portions of the projections extending predominantly perpendicular to the continuous wall portions.

Conveniently, the separate parts of the cage component are made from blanks or sections pressed or otherwise cut from mild steel sheet and then bent to shape.

In one design the continuous wall portion of each blank has sets of spaced-apart projections along both its side edges and these projections are bent to extend perpendicular to the wall portion and parallel to one another to define the reception pockets for the rollers. Some of the edges of the projections which define the pockets are located do use radially inwardly of the common pitch circle diameter exending through the centres of the rollers.

In another design, the continuous wall portion has spaced-apart projections along just one of its side edges Inner regions of the projections adjacent the wall portion are bent perpendicular to the wall portion and outer regions are bent at an angle, e.g. 135° in one direction and another opposite direction axially outwardly fromn the wall portion which forms the side of the cage component. Outermost regions of the projections remote from the side wall portion then extend parallel to the innernost regions but in a different axial plane. Between the projections there are inclined intermediate regions preferably formed with semi-circular side edges which match the curvature of the rollers. These side edges then define the pockets for the rollers which are at least partially located during use radially inwardly of the common pitch circle diameter extending through the centres of the rollers. The outermost regions of the projections of the separate parts overlap one another and are joined together as described previously to create the semi-circular cage component.

To assemble a complete cage, two cage components constructed as described can be fitted together. To enable this fixing each cage component may have one or more integral hook-like projections at one end. These hook-like projections can each engage in a recess or opening in the opposite end. In a preferred construction the hook like projections simply overlap with end regions of the continuous wall portion at the opposite end. Dimples and holes can locate the hook-like projections of the cage components to the opposite end so that the cage components can be snap-fitted together. Notches can be provided at the ends of the cage components to provide a location for a tool used to detach the cage components from one another.

In a further aspect, and as is known fom GB-A-919983, the invention provides a method of making a cage component for a roller bearing which comprises producing a pair of blanks or sections each with a continuous wall portion with projections spaced apart around the wall portion, bending the continuous wall portion relative to the projections so that at least some regions of the projections extend generally perpendicular to the wall portion, aligning the projections of the blanks to define roller-locating pockets and interconnecting the blanks after bending so that the wall portions are spaced apart by at least some of the projections which extend in the same general direction and are fixed together at a central region between the wall portions.

In contrast to GB-A-919983, and in accordance with the invention, the blanks are semi-circular and equipped with means for creating integral inter-engageable releasable fixing means at the opposite ends of the component to enable the component to be interconnected with another similar component to form a complete circular cage and the regions where the aligned projections are joined together are defined by face-to-face overlapping portions of the projections extending predominantly perpendicular to the wall portions.

The blanks and the subsequent formed sections can be provided with the complementary inter-engageable integral releasable fixing means such as:

a) hooks or lugs at one end
b) receiving means for the hooks or lugs such as recesses, openings or cut-outs at their opposite ends and/or
c) dimples and holes which snap-fit together.

A complete cage can then be assembled by inter-fitting the fixing means at the ends of the previously formed cage components.

The invention may be understood more readily, and various other aspects and features of the invention may become apparent, from consideration of the following description.

BRIEF DESCRIPTION OF THE DRAWINGS

Embodiments of the invention will now be described, by way of examples only, with reference to the accompanying drawings wherein.

BEST MODES OF CARRYING OUT THE INVENTION

Figure 1:
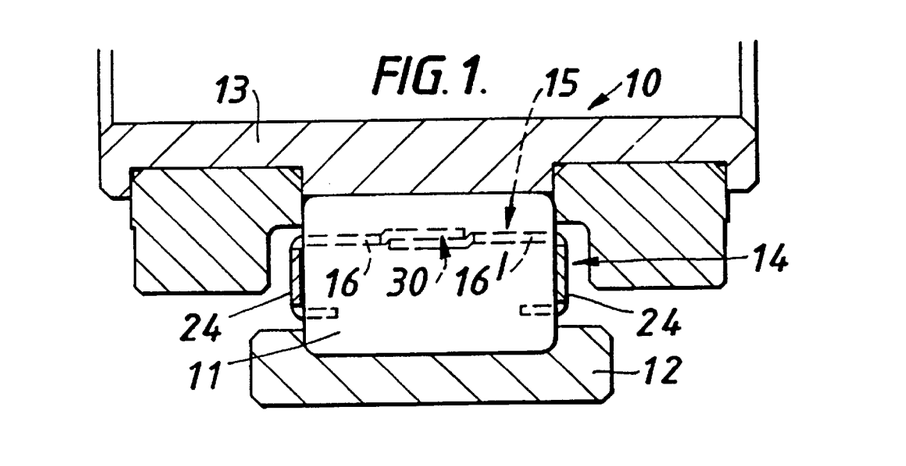
FIG. 1 is a sectional end view of part of a split roller bearing assembly constructed in accordance with the present invention.

As shown in FIG. 1, a split roller bearing 10 employs rollers 11 guided for progressive rolling around raceways defined between inner and outer rings 12, 13.

A cage 14 locates and guides the rollers 11 and maintains the rollers 11 in spaced-apart relationship. The rings 12, 13 and the cage 14 are designed to separate along a common diametric plane so that each of these components is made of two separable halves. The reference numeral 15 in the drawings designate one of the half-cage component.

The present invention is concerned with the construction of the cage 14 and the cage component 15 which forms one half of the cage 14.

Figure 3:
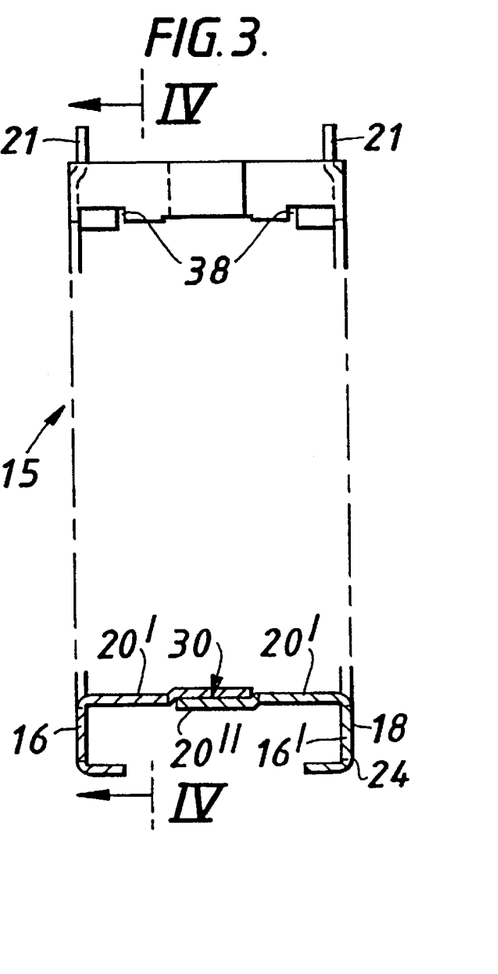
FIG. 3 is a sectional end view of the cage component shown in FIG. 2.
Figure 4:
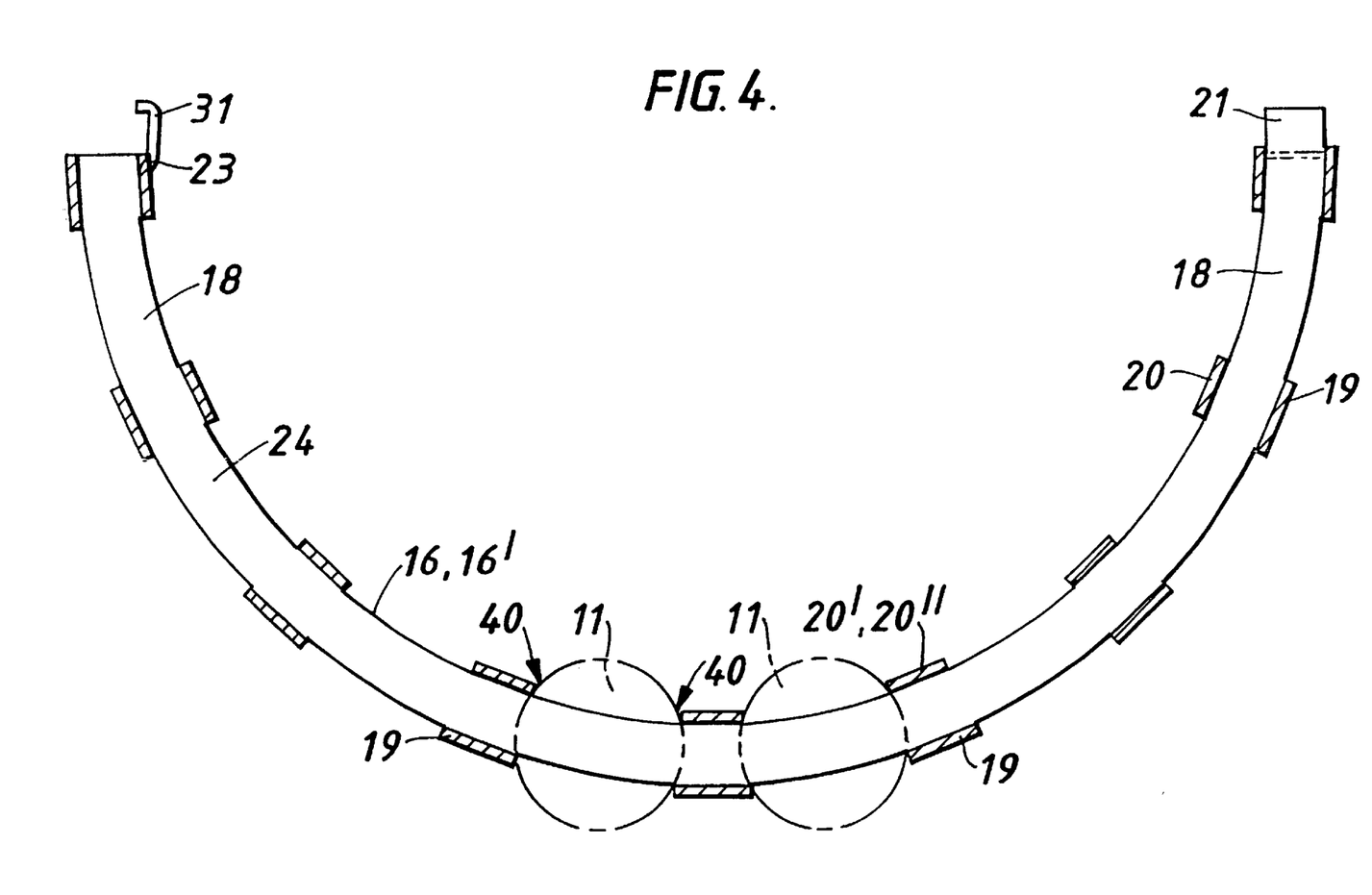
FIG. 4 is a sectional side view of the cage component, the view being taken along the line IV—IV in FIG. 3.
Figure 5:
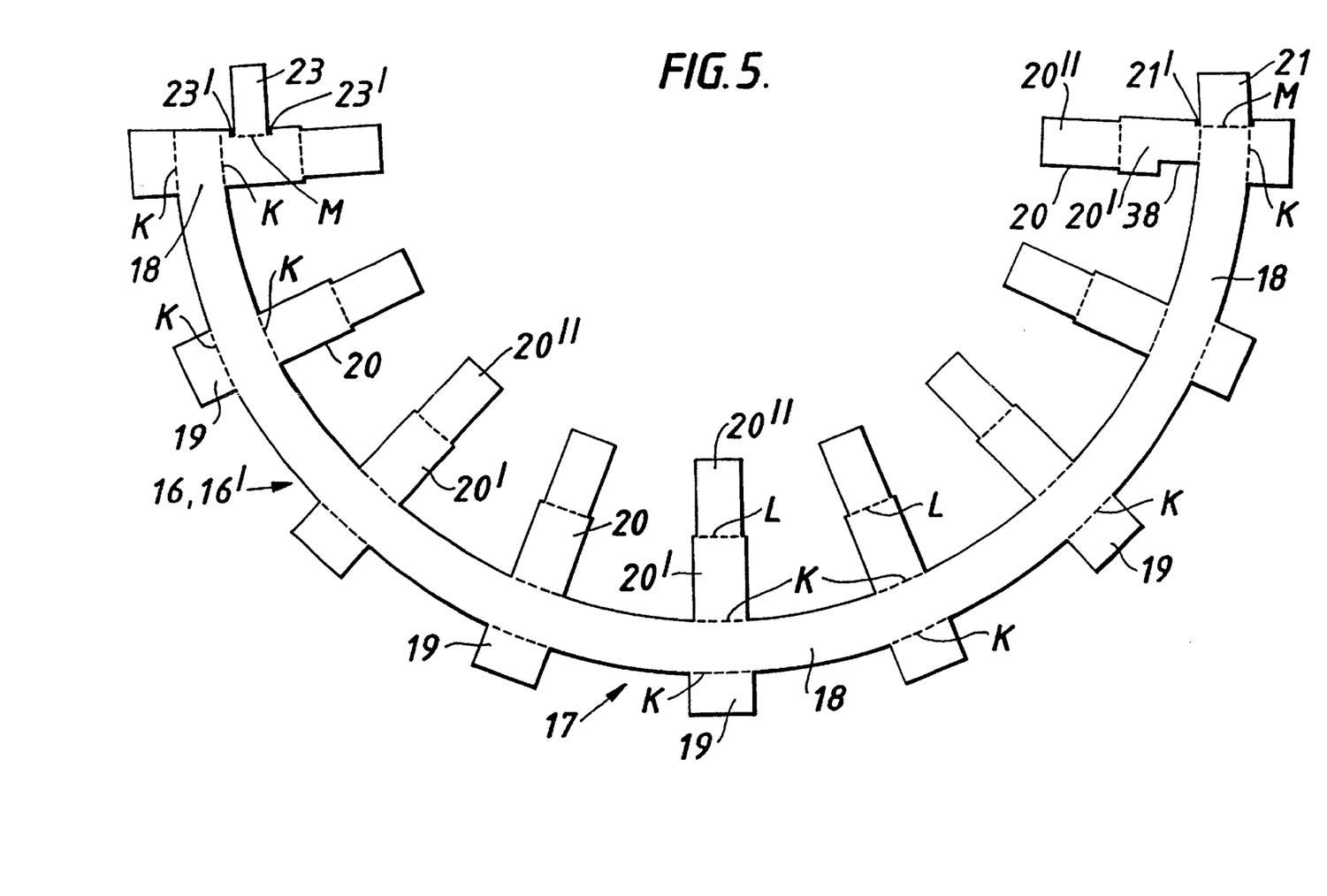
FIG. 5 depicts a blank pressing used to create one part of the cage component shown in FIGS. 2 to 4.

As shown particularly in FIGS. 2 to 5, the cage component 15 is itself made up of two complementary half sections 16, 16' each made from a semi-circular piece-part or blank 17 as shown in FIG. 5.

The blank 17 is in the form of a mild steel pressing, typically 1 mm in thickness. The blank 17 has a main continuous semi-circular wall portion 18. Extending from the sides of the wall portion 18 there are pairs of aligned radial projections 19, 20 spaced apart regularly around the circumference of the wall portion 18. Each projection 20 is somewhat longer than the associated projection 19 and each projection 20 has an inner portion 20' adjacent the main wall portion 18 and an outer portion 20" of reduced width. One end of the blank 17 has a circumferential projection 21 forming a continuation of the wall portion 18 with relief cut-outs 21' between the side edges of the projection 21 and the end of the main wall portion 18. At the other end of the blank 17 there is a circumferential projection 23 extending from the outer edge of the end most radial projection portion 20'. Similarly the side edges of the projection 23 have relief cut-outs 23' at the adjacent edge of the projection portion 20'. The projection 23 matches with a complementary recess 38 at the inner edge of the end projection portion 20' adjacent the wall portion 18 at the opposite end.

The blank 17 is subjected to a bending treatment along fold lines K between the main wall portion 18 and the projections 19, 20 along fold lines L between the outer and inner portions 20', 20" of the projections 20 and along fold lines M between the projection 23 and the associated wall portion 20' between the projection 21 and the wall portion 18 and at the end region of the projection 23.

Figure 2:
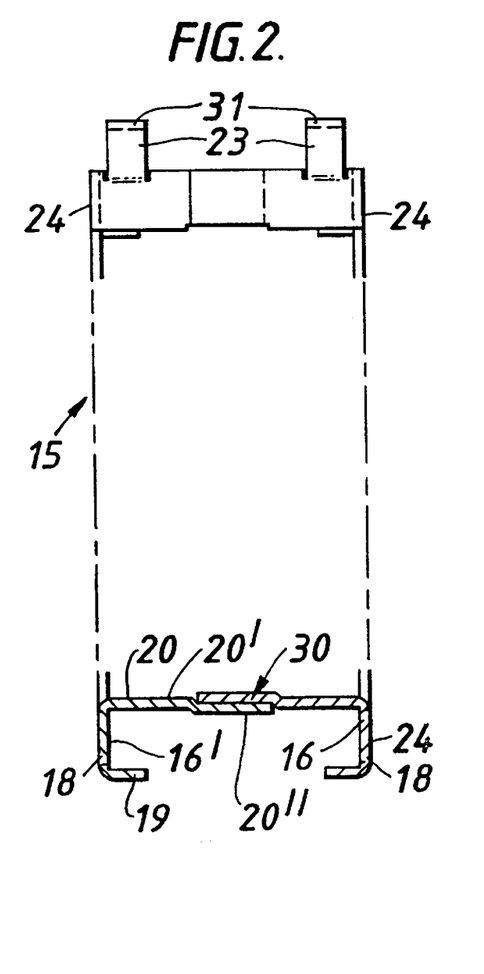
FIG. 2 is a sectional end view of a two-part cage component used in the assembly shown in FIG. 1.

After bending, the wall portion 18 is perpendicular to both the projections 19, 20. After bending, the two separate complementary parts or half sections 16, 16' are fixed together so that their wall portions 18 provide the opposite sides 24 of the individual cage component 15. The outer portions 20" of the projections 20 extend axially inwardly of the sides 24 and are bent shallowly (line L) to overlap one another at an axial central region as indicated by reference numeral 30. The overlapped portions 20" can be fixed together in a variety of ways for example, by welding, riveting, clinching or by adhesive. The projections 23 of the two parts 16, 16' are bent (lines M) into a shallow U shaped profile to act as hooks 31 to fit in the recesses 38 of another component 15 fashioned in the same manner to form one complete cage 14. The projections 21 are similarly bent at a shallow angle relative to the wall portions 18 (lines M) to overlap with the wall portions 18 of the end of the other components 15 with the projections 23. The whole cage 14 can thus be assembled or disassembled by inter-engaging or releasing the projections 21, 23.

The rollers 11 are reliably located and retained in pockets 40 defined between the side edges of parallel projections 19, 20 as represented in FIG. 4.

Figure 6:
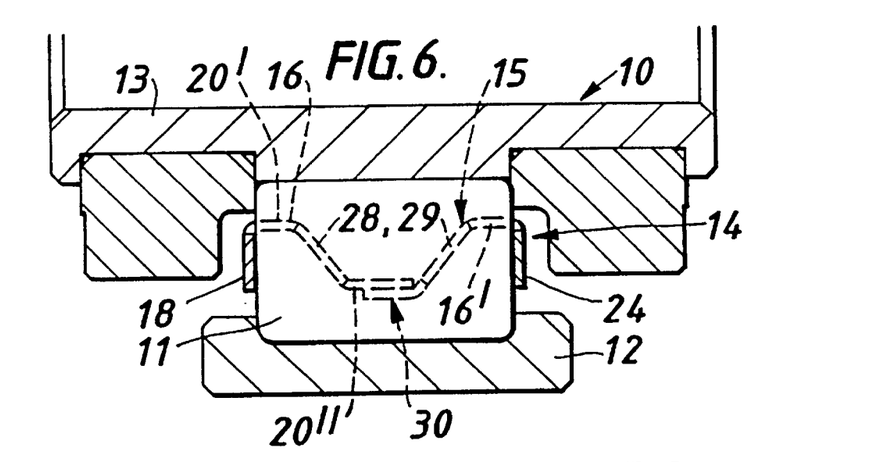
FIG. 6 is a sectional end view of part of another split roller bearing assembly constructed in accordance with the present invention.
Figure 7:
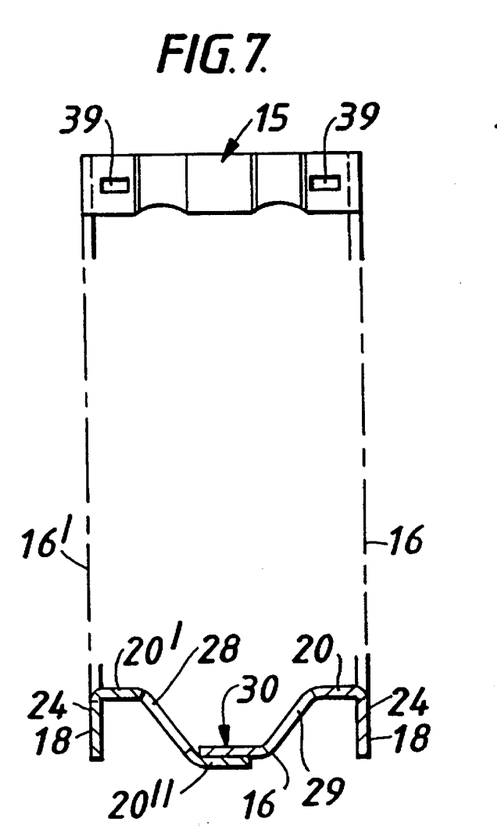
FIG. 7 is a sectional end view of a two-part cage component used in the assembly shown in FIG. 6.
Figure 8:
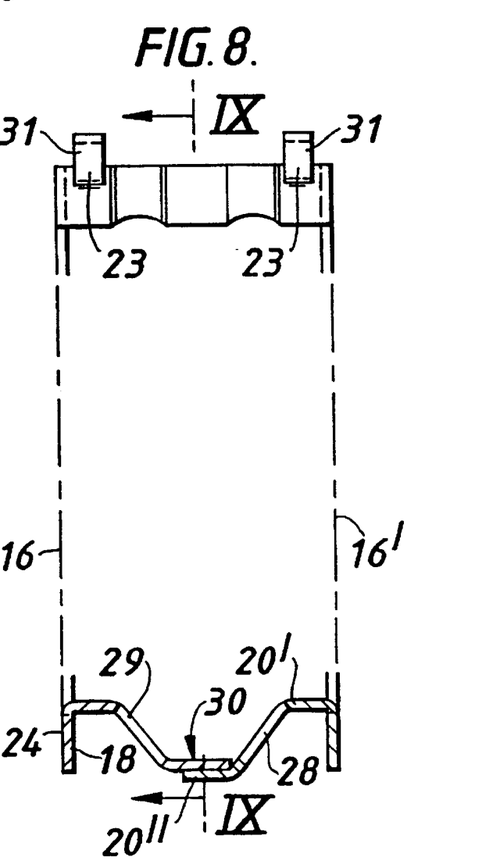
FIG. 8 is a sectional end view of the cage component shown in FIG. 7.
Figure 9:
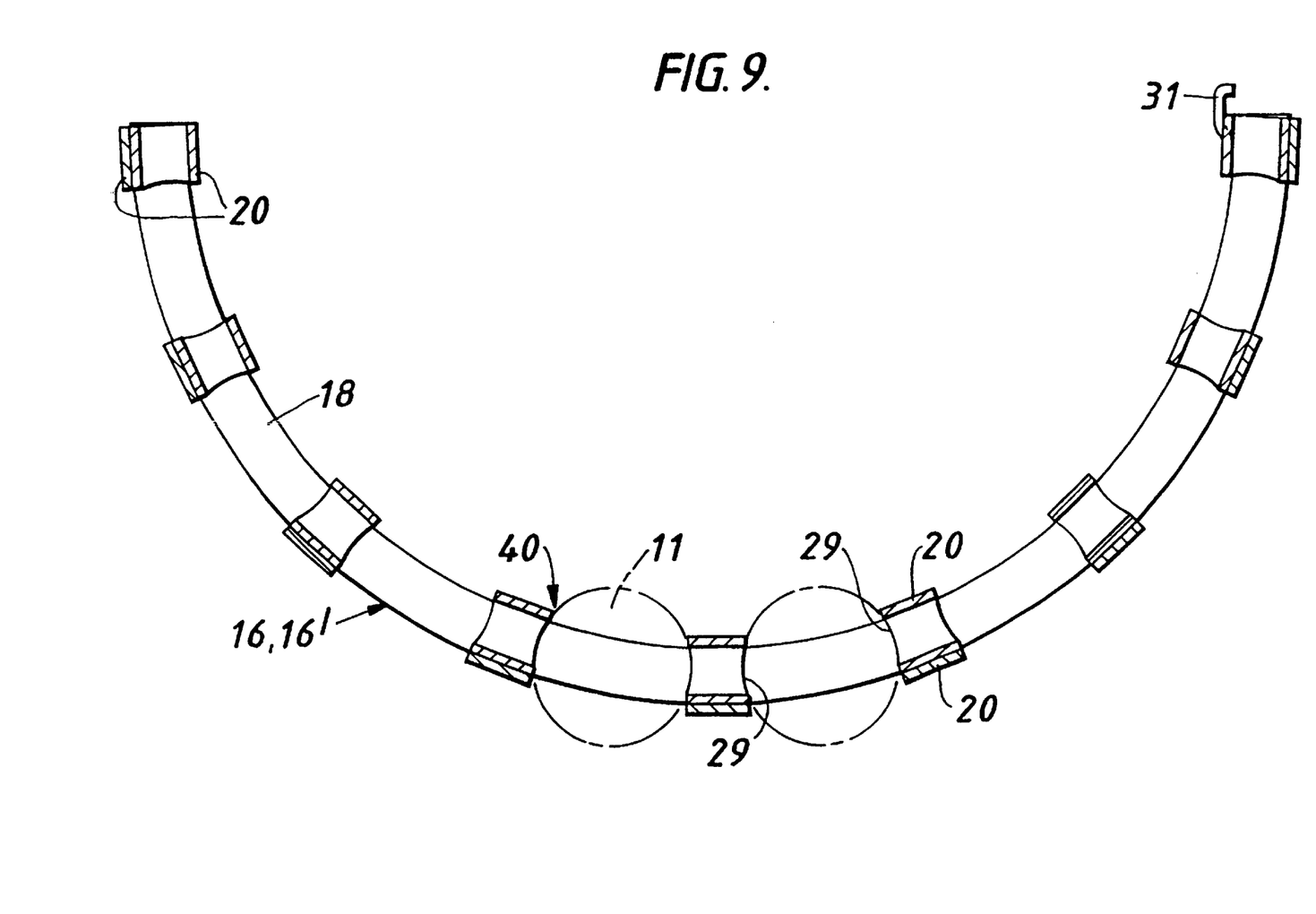
FIG. 9 is a sectional side view of the cage component, the view being taken along the line IX—IX in FIG. 8.
Figure 10:
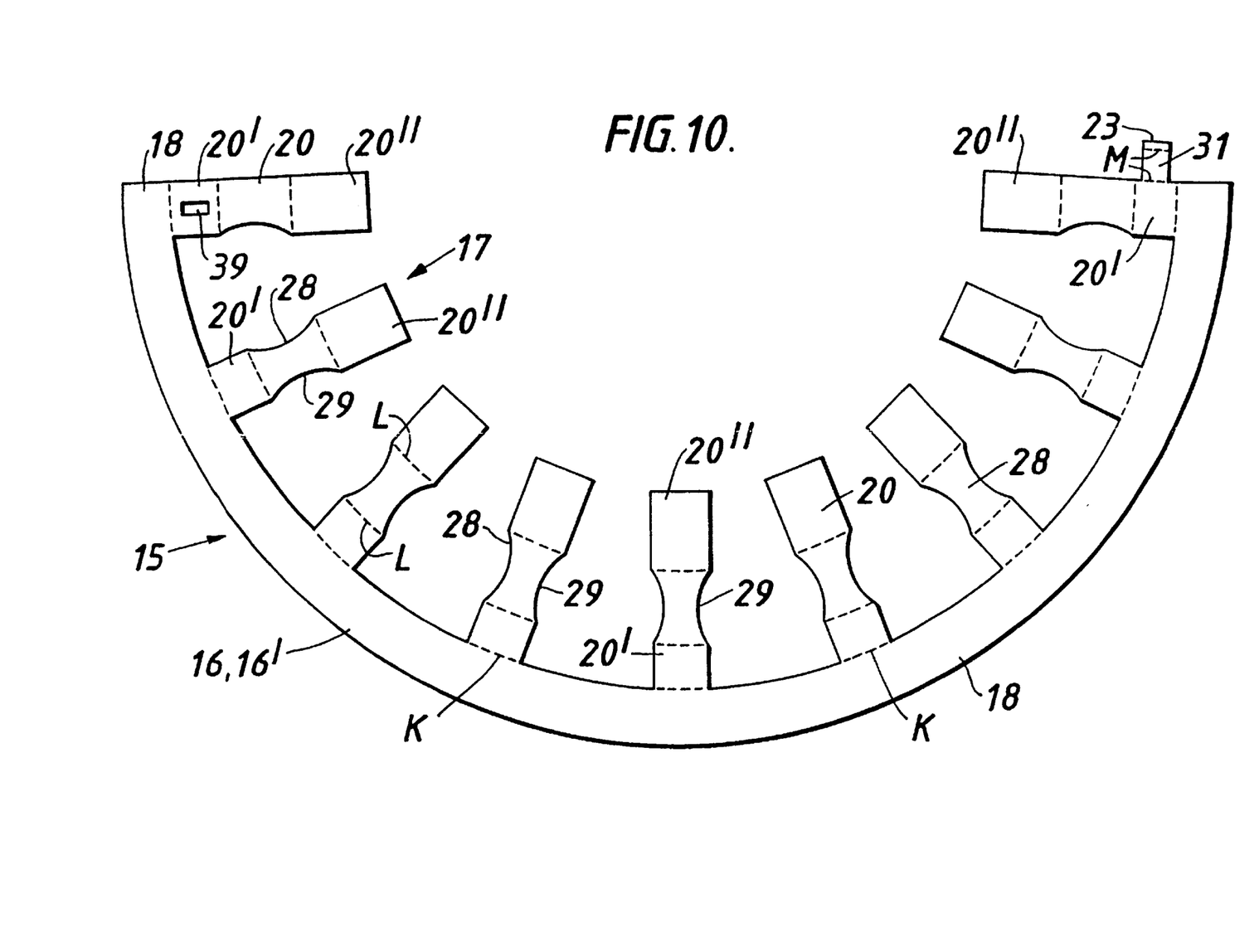
FIG. 10 depicts a blank pressing used to create one part of the cage component shown in FIGS. 6 to 9.

In FIGS. 6 to 10, like reference numerals are used to denote like parts in a second embodiment of the invention. As shown, in FIGS. 6 to 10 the blank 17 used to form one of the half sections 16, 16' only has the inner radial projections 20 each composed of portions 20', 20" with the outer portion 20" being of increased width. The projections 20 also each have an intermediate portion 28 between the portions 20', 20" and the intermediate portion 28 has curvilinear edges 29 matching the curvature of the rollers 11. At one end of the blank 17 the endmost projection 20 has a circumferential projection 23 extending from the outer edge of the inner portion 20'. At the opposite end, the matching portion 20' of the endmost projection 23 is provided with a rectangular opening 39. The reference K again denotes the bending lines between the main body portion 18 and projections 20 which are perpendicular and the reference L bending lines between the intermediate portion 28 and the inner and outer portions 20', 20". These lines L are substantially at 135° in opposite directions. As a result of the profile shown in FIGS. 6 to 8 is created. The projection 21 is bent along lines M as before to create the hook-like profile 31.

Again the overlapping region 30 at the centre of the cage component is produced by the overlapping projection portions 20" which lie parallel to the inner portions 20' but in a different plane. The overlapping portions 20" are joined for example in the manner described above. The rollers 11 are located and retained in pockets 40 defined between the curvilinear edges 29 of the portions 28.

The complete 14 cage is established by fitting the hooks 31 in the openings 39 at opposite ends of the components 15 constructed from the half section 16, 16'.

Figure 13:
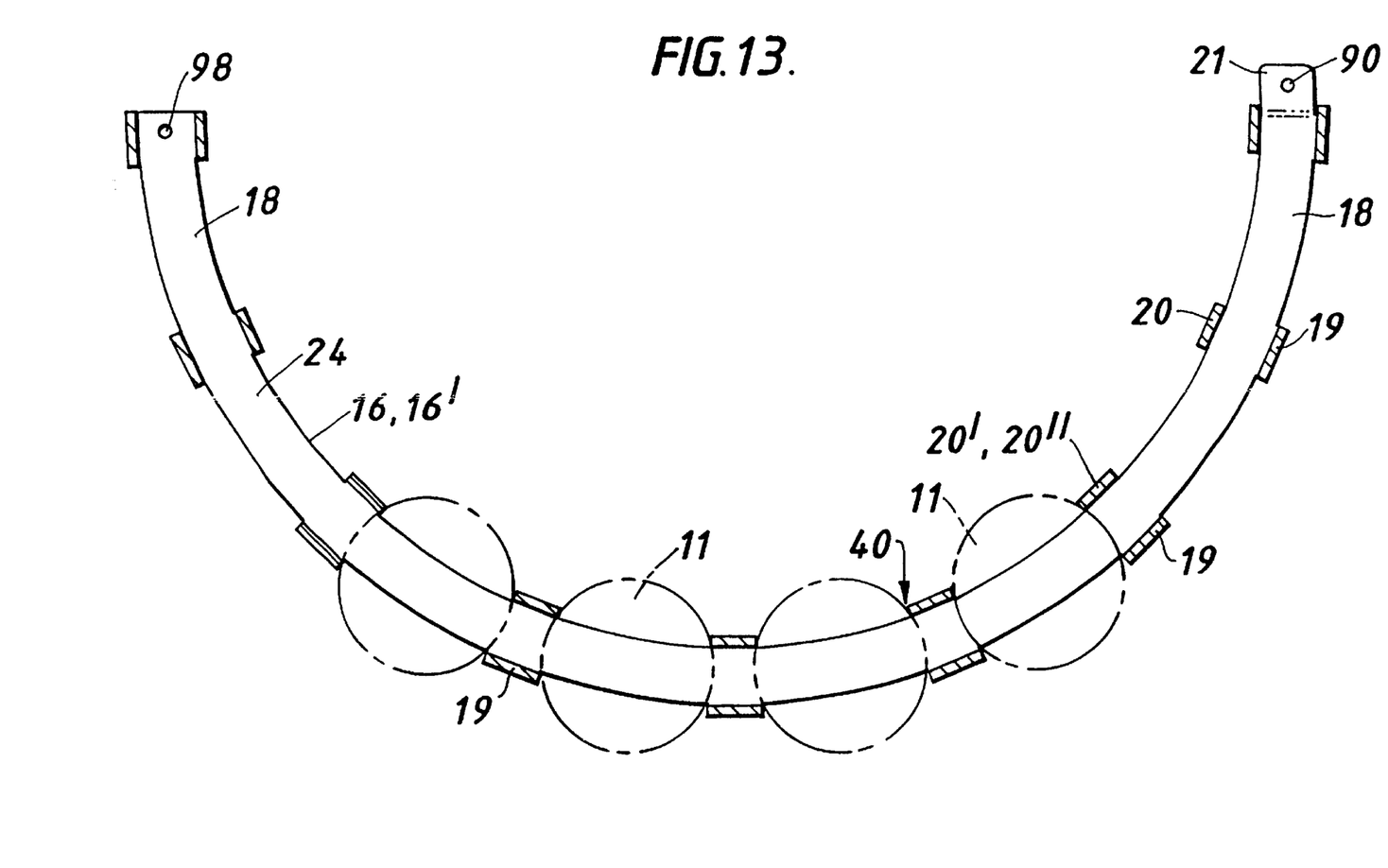
FIG. 13 is a sectional side view of the cage component shown in FIGS. 11 and 12, the view being taken along the line XIII—XIII in FIG. 12
Figure 14:
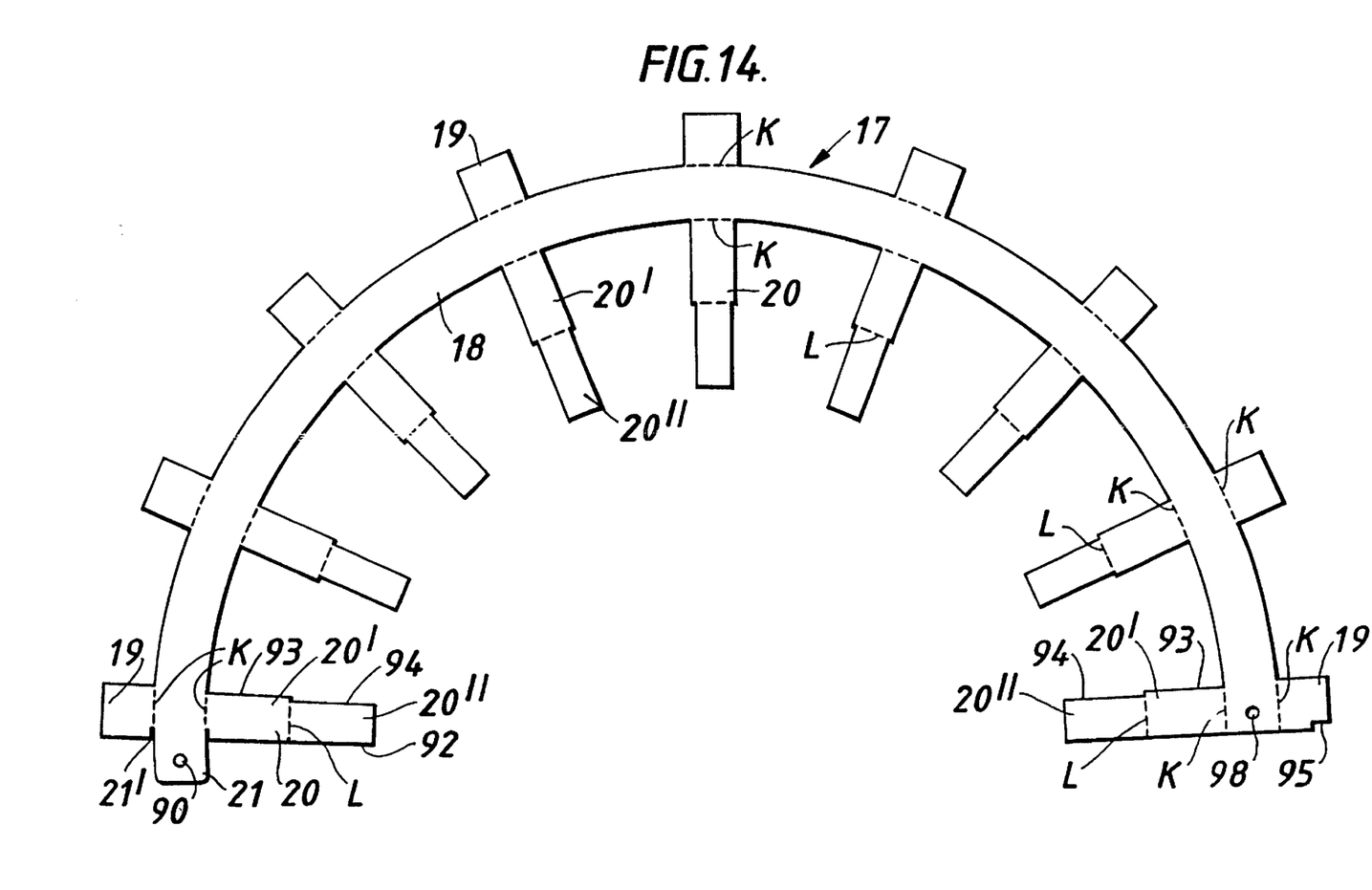
FIG. 14 depicts a blank pressing used to create one part of the cage component shown in FIGS. 11 to 13.

In FIGS. 11 to 14 like reference numerals are again used to denote like parts in a third embodiment of the invention. As shown in FIG. 14 the blank 17 used to form one of the half sections 16, 16' is similar to the blank 17 used in the first embodiment with the pairs of aligned radial projections 19, 20 spaced apart around the semi-circular wall portion 18. Each projection 20 again has an inner portion 20' and an outer portion 20" of reduced width. The blank 17 in this third embodiment differs from the blank in the first embodiment essentially in the construction of the end regions of the blank 17. At one end region the blank 17 has the circumferential projection 21 as a continuation of the main wall portion 18 with relief cut-outs 21' between the side edge of the projection 21 and the end of the wall projection 18. A pressed-out dimple 90 is provided in the projection 21. The projection 20 at this end region of the blank 17 has the inner portion 20' and the outer portion 20" sharing a common outer edge 92 while the inner edges 93, 94 of these portions 20', 20" are offset.

The endmost projection 20 at the other end region of the blank 17 is formed in a similar manner as shown. At this other region however, there is no circumferential projection 21 and a hole 98 is provided in the main wall portion 18 to correspond to the dimple 90. A notch 95 is provided in the outer edge of the projection 19 at this other end region. The blank 17 is again subjected to bending along the fold lines K, L, M and the two half sections 16, 16' are fixed together with the outer portions 20" of the projections 20 overlapping as before.

Figure 11:
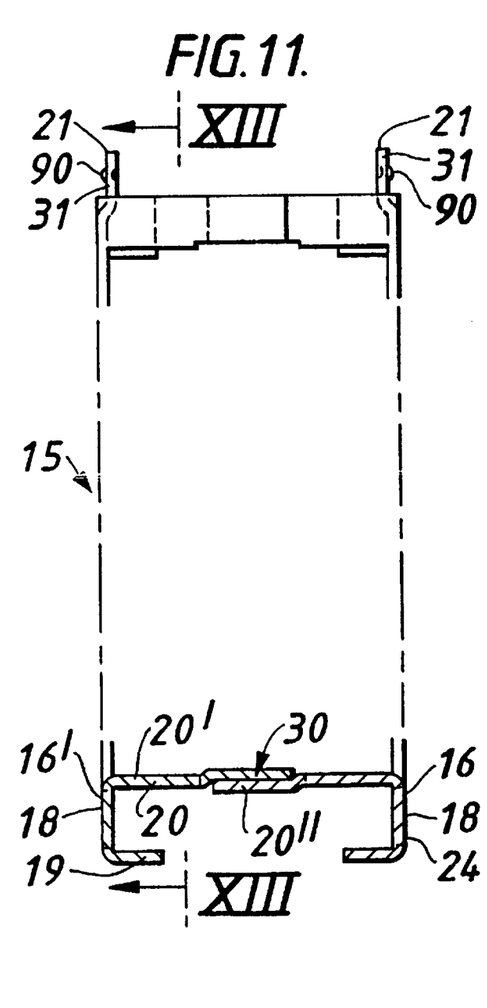
FIG. 11 is a sectional end view of a two-part cage component usable in a further split roller bearing assembly constructed in accordance with the invention.
Figure 12:
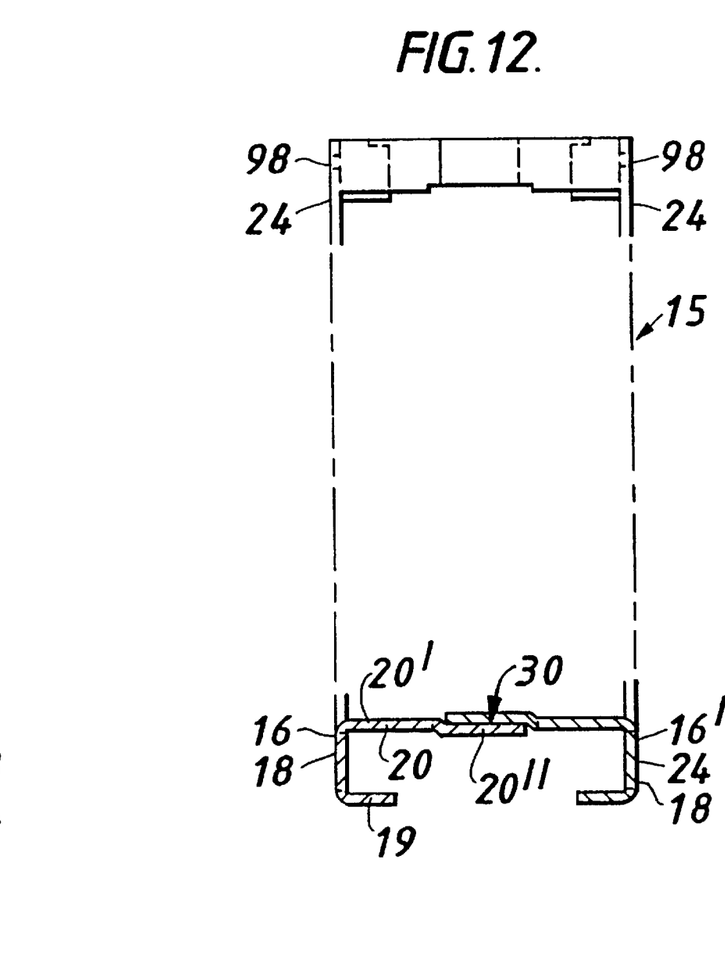
FIG. 12 is a sectional end view of the cage component shown in FIG. 11.

As shown in FIGS. 11 and 13, the dimples 90 on the locating hooks 31 formed by the bent projections 21 at one end of the sub-assembly can be snap-fitted into the holes 98 at the other end of a complementary sub-assembly to form the whole cage 14. The notches 95 serves as a tool location and thus as an aid for dismantling the sub-assemblies. It is of course possible to provide the holes 98 in the projections 21 and the dimples 90 in the main wall portions 18.

What is claimed is:

1. A cage component for use in a roller bearing, said component being made from a pair of separate parts or blanks bent to shape and joined together, the blanks having continuous wall portions for overlapping the ends of rollers as the sides of the component and projections spaced apart along the continuous wall portions and aligned to form pockets for receiving and locating the rollers with at least some of the corresponding aligned projections of the blanks being joined to one another at a central region between the continuous wall portions, wherein the blanks are semi-circular and the component is equipped with integral inter-engageable complementary releasable fixing means at its opposite ends for enabling the component to be detachably interconnected with another similar component to form a complete circular cage and the regions where the aligned projections of the blanks are joined together are defined by face-to-face overlapping portions of the projections extending predominantly perpendicular to the continuous wall portions.

2. The component according to claim 1, wherein the blanks are made from sections pressed or otherwise cut from the mild steel sheet and then bent to shape.

3. The component according to claim 1, wherein each part or blank has first and second sets of projections, the first and second sets extending generally perpendicular to the continuous wall portions in different planes, with the first sets of projections including said at least some aligned joined projections having a greater axial dimension than the other set of projections.

4. The component according to claim 1, wherein the fixing means takes the form of hook-like projections and complementary recesses.

5. The component according to claim 1, wherein each part or blank has first and second sets of projections, the sets extending generally perpendicular to the continuous wall portions with the first and second sets lying in different planes and wherein the first set of projections form said at least joined projections and the second set of projections are axially spaced apart from one another.

6. The component according to claim 5, wherein the pockets are defined by edges of the first and second set of projections.

7. The component according to claim 1, wherein projections of each part or blank are bent to provide inner regions adjacent the continuous wall portion and outer regions remote from the continuous wall portion, the inner and outer regions of the projections lying in different planes substantially perpendicular to the continuous wall portions with the outer regions providing the overlapping joined portions.

8. The component according to claim 7, wherein the projections of each part or blank also have intermediate regions between the inner and outer regions, the intermediate regions extending at an angle relative to the associated inner and outer regions and having curved edges which define the pockets for the rollers.

9. The component according to claim 8, wherein at least some of the edges of the projections or parts of the edges which define the pockets are located during use radially inwardly of the common pitch circle diameter extending through the centers of the rollers.

10. The component according to claim 1, wherein the fixing means takes the form of hook-like projections at one end of the component and sets of dimples and holes at the opposite ends of the component.

11. The component according to claim 10, wherein the dimples are provided on the hook-like projections and the holes are provided in an opposite end region of the continuous wall portion.

12. The component according to claim 11, wherein one or more notches are provided in one or other end regions of the blanks to aid disassembly of two said components.

13. A cage for a split roller bearing constructed from two cage components in accordance with claim 1.

14. A method of making a cage component for use in a roller bearing, said method comprising producing a pair of blanks or sections each with a continuous wall portion with projections spaced apart around the wall portion, bending the continuous wall portion relative to the projections so that at least some regions of the projections extend generally perpendicular to the wall portion, aligning the projections of the blanks to define roller-locating pockets and interconnecting the blanks after bending so that the wall portions are spaced apart by at least some of the projections which extend in the same general direction and are fixed together at a central region between the wall portions, wherein the blanks are semi-circular and equipped with means for creating integral inter-engageable releasable fixing means at the opposite ends of the component to enable the component to be interconnected with another similar component to form a complete circular cage and the regions where the aligned projections are joined together are defined by face-to-face overlapping portions of the projections extending predominantly perpendicular to wall portions.

15. The method of making a cage component according to claim 14, wherein each blank has projections extending from each side edge of the continuous wall portion to form first and second sets of projections and the sets of projections are bent to extend perpendicular to the wall portion in different parallel planes and collectively define the pockets for locating and retaining rollers with said at least some overlapping projections being formed by at least some of the first set of projections.

16. The method according to claim 14, wherein each blank has the projections extending from one side edge of the continuous wall portion and the projections are bent to provide inner and outer regions respectively adjacent and remote from the wall portion, the inner and outer regions extending perpendicular to the wall portion in different planes and intermediate regions between the inner and outer regions which extend at an angle to the associated inner and outer regions.

17. The method according to claim 16, further comprising providing the intermediate regions with curved side edges and to define the pockets.

* * * * *